(12) United States Patent
Datta et al.

(10) Patent No.: US 9,208,292 B2
(45) Date of Patent: *Dec. 8, 2015

(54) ENTERING A SECURED COMPUTING ENVIRONMENT USING MULTIPLE AUTHENTICATED CODE MODULES

(71) Applicant: Intel Corporation, Santa Clara, CA (US)

(72) Inventors: Sham M. Datta, Hillsboro, OR (US); Ernie F. Brickell, Hillsboro, OR (US); Mohan J. Kumar, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 329 days.

This patent is subject to a terminal disclaimer.

(21) Appl. No.: 13/837,837

(22) Filed: Mar. 15, 2013

(65) Prior Publication Data

US 2013/0212673 A1 Aug. 15, 2013

Related U.S. Application Data

(63) Continuation of application No. 12/650,579, filed on Dec. 31, 2009.

(51) Int. Cl.
| | | |
|---|---|---|
| G06F 21/00 | (2013.01) | |
| G06F 21/57 | (2013.01) | |
| G06F 21/71 | (2013.01) | |

(52) U.S. Cl.
CPC .............. *G06F 21/00* (2013.01); *G06F 21/57* (2013.01); *G06F 21/572* (2013.01); *G06F 21/71* (2013.01); *G06F 2221/2149* (2013.01); *G06F 2221/2153* (2013.01)

(58) Field of Classification Search
USPC .......................................................... 726/16
See application file for complete search history.

(56) References Cited

U.S. PATENT DOCUMENTS

| | | | |
|---|---|---|---|
| 6,948,070 | B1 | 9/2005 | Ginter et al. |
| 2003/0055840 | A1* | 3/2003 | Kawaoka .................... 707/104.1 |
| 2003/0126454 | A1* | 7/2003 | Glew et al. ..................... 713/193 |
| 2003/0188165 | A1* | 10/2003 | Sutton et al. .................. 713/176 |

(Continued)

FOREIGN PATENT DOCUMENTS

| | | |
|---|---|---|
| CN | 1445693 A | 10/2003 |
| CN | 101410772 A | 4/2009 |

(Continued)

OTHER PUBLICATIONS

Frenn, Evan J. Towards a Trustworthy Thin Terminal for Securing Enterprise Networks. Diss. Worcester Polytechnic Institute, 2013.*
Office Action Received for Taiwanese Patent Application No. 099143486, mailed on Jul. 22, 2013, 11 Pages of Taiwanese Office Action and 8 Pages of English Translation.
Office Action Received for Chinese Patent Application No. 201010625143.3, mailed on Apr. 2, 2013, 23 Pages of Chinese Office Action and 33 Pages of English Translation.

(Continued)

*Primary Examiner* — Harris C Wang
(74) *Attorney, Agent, or Firm* — Thomas R. Lane

(57) ABSTRACT

Systems, apparatuses, and methods, and for entering a secured system environment using multiple authenticated code modules are disclosed. In one embodiment, a processor includes a decoder and control logic. The decoder is to decode a secured enter instruction. The control logic is to find an entry corresponding to the processor in a match table in a master authenticated code module and to read a master header and an individual authenticated code module from the master authenticated code module in response to decoding the secured enter instruction.

8 Claims, 5 Drawing Sheets

(56) References Cited

U.S. PATENT DOCUMENTS

| | | | |
|---|---|---|---|
| 2004/0117318 A1* | 6/2004 | Grawrock | 705/66 |
| 2005/0273602 A1* | 12/2005 | Wilson et al. | 713/164 |
| 2006/0015748 A1* | 1/2006 | Goto et al. | 713/190 |
| 2006/0224878 A1* | 10/2006 | Datta et al. | 713/2 |
| 2008/0109638 A1* | 5/2008 | Wilson et al. | 712/29 |
| 2009/0144754 A1* | 6/2009 | Zimmer et al. | 719/318 |
| 2009/0204823 A1* | 8/2009 | Giordano et al. | 713/190 |
| 2011/0161676 A1* | 6/2011 | Datta et al. | 713/189 |

FOREIGN PATENT DOCUMENTS

| | | |
|---|---|---|
| JP | 62-128354 A | 6/1987 |
| JP | 2005-535005 A | 11/2005 |
| JP | 2005-346689 A | 12/2005 |
| JP | 2006-507548 A | 3/2006 |
| JP | 2006-221631 A | 8/2006 |
| JP | 2008-293033 A | 12/2008 |
| JP | 2009-116901 A | 5/2009 |
| JP | 2009-532783 A | 9/2009 |
| TW | 583568 B | 4/2004 |
| TW | I237974 B | 8/2005 |
| TW | 200910900 A | 3/2009 |

OTHER PUBLICATIONS

Office Action Received for Chinese Patent Application No. 201010625143.3, mailed on Nov. 29, 2013, 20 Pages of Chinese Office Action and 24 Pages of English Translation.

Office Action Received for Japanese Patent Application No. 2010-277703, mailed on Jan. 22, 2013, 3 pages of office action and 4 pages of English Translation.

Office Action Received for Japanese Patent Application No. 2010-277703, mailed on May 14, 2013, 2 pages of office action and 3 pages of English Translation.

Office Action Received for Chinese Patent Application No. 201010625143.3, mailed on May 19, 2014, 22 Pages of Chinese Office Action and 24 Pages of English Translation.

Office Action Received for Taiwanese Patent Application No. 099143486, mailed on May 26, 2014, 12 Pages of Taiwanese Office Action and 9 Pages of English Translation.

Office Action Received for Taiwanese Patent Application No. 099143486, mailed on Dec. 26, 2014, 6 Pages of Taiwanese Office Action and 2 Pages of English Translation.

Office Action Received for Japanese Patent Application No. 2013-194105, mailed on Sep. 2, 2014, 3 Pages of Japanese Office Action and 4 Pages of English Translation.

\* cited by examiner

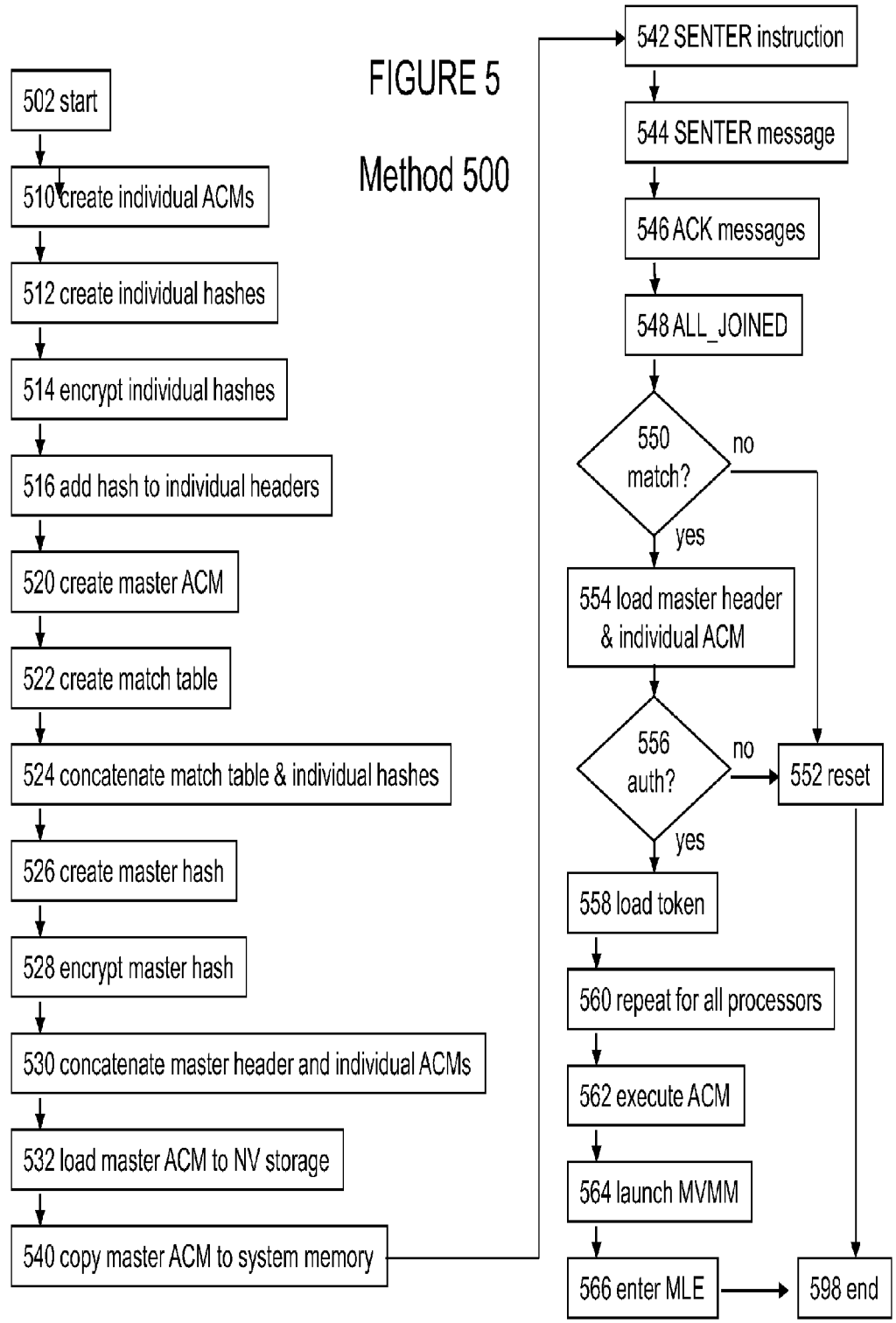

ENTERING A SECURED COMPUTING ENVIRONMENT USING MULTIPLE AUTHENTICATED CODE MODULES

CROSS REFERENCE TO RELATED APPLICATIONS

This application is a Continuation of U.S. patent application Ser. No. 12/650,579, entitled "ENTERING A SECURED COMPUTING ENVIRONMENT USING MULTIPLE AUTHENTICATED CODE MODULES" filed on Dec. 31, 2009.

BACKGROUND

1. Field

The present disclosure pertains to the field of information processing; more specifically, to information processing system security.

2. Description of Related Art

Information processing systems, such as those including a processor in the Intel® Pentium® Processor Family from Intel Corporation, may support operation in a secured system environment. A secured system environment may include a trusted partition and an un-trusted partition. The bare platform hardware of the system and trusted software may be included in the trusted partition. Direct access from the un-trusted partition to the resources of the trusted partition may be prevented to protect any secrets that the system may contain from being discovered or altered. These secrets may include passwords, keys, and private or confidential information generated or stored on the information processing system.

The bare platform hardware of the system may be included in the trusted partition or domain through the execution of a secured system entry protocol. For example, an initiating processor may execute a secured enter ("SENTER") instruction, to which all agents in the system must respond appropriately in order for the protocol to succeed. The responding agents may be prevented from executing any program instructions or process any external transactions during the secured entry process, so that the initiating processor may validate a signed code module as authentic and trusted, execute the signed code module to configure the system to support trusted operations, measure (cryptographically, using a hash extend function) and then initiate the execution of a measured virtual machine monitor ("MVMM"). The MVMM may create one or more virtual machine environments in which to run un-trusted software, such that un-trusted software does not have direct access to system resources.

BRIEF DESCRIPTION OF THE FIGURES

The present invention is illustrated by way of example and not limitation in the accompanying figures.

FIG. 5 illustrates a method for entering a secured computing environment using multiple authenticated code modules according to an embodiment of the present invention.

DETAILED DESCRIPTION

Embodiments of the present invention in systems, apparatuses, and methods for entering a secured computing environment using multiple authenticated code modules (each, an "ACM") are described. In the description, specific details such as processor and system configurations may set forth in order to provide a more thorough understanding of the present invention. It will be appreciated, however, by one skilled in the art that the invention may be practiced without such specific details. Additionally, some well known structures, circuits, and the like have not been shown in detail, to avoid unnecessarily obscuring the present invention. Furthermore, this description may refer to instructions by names that may be used according to one embodiment (i.e., "SENTER"); in other embodiments, these instructions or similar instructions may have different names.

Embodiments of the present invention provide for entering a secured computing environment using multiple ACMs. The use of multiple ACMs may be desired because an information processing system may include multiple processors or processor packages, and a single ACM may not be adequate for initializing all of these processors or processor packages for entry into the secured environment when these processors or processor packages may not be identical.

Figure 1:
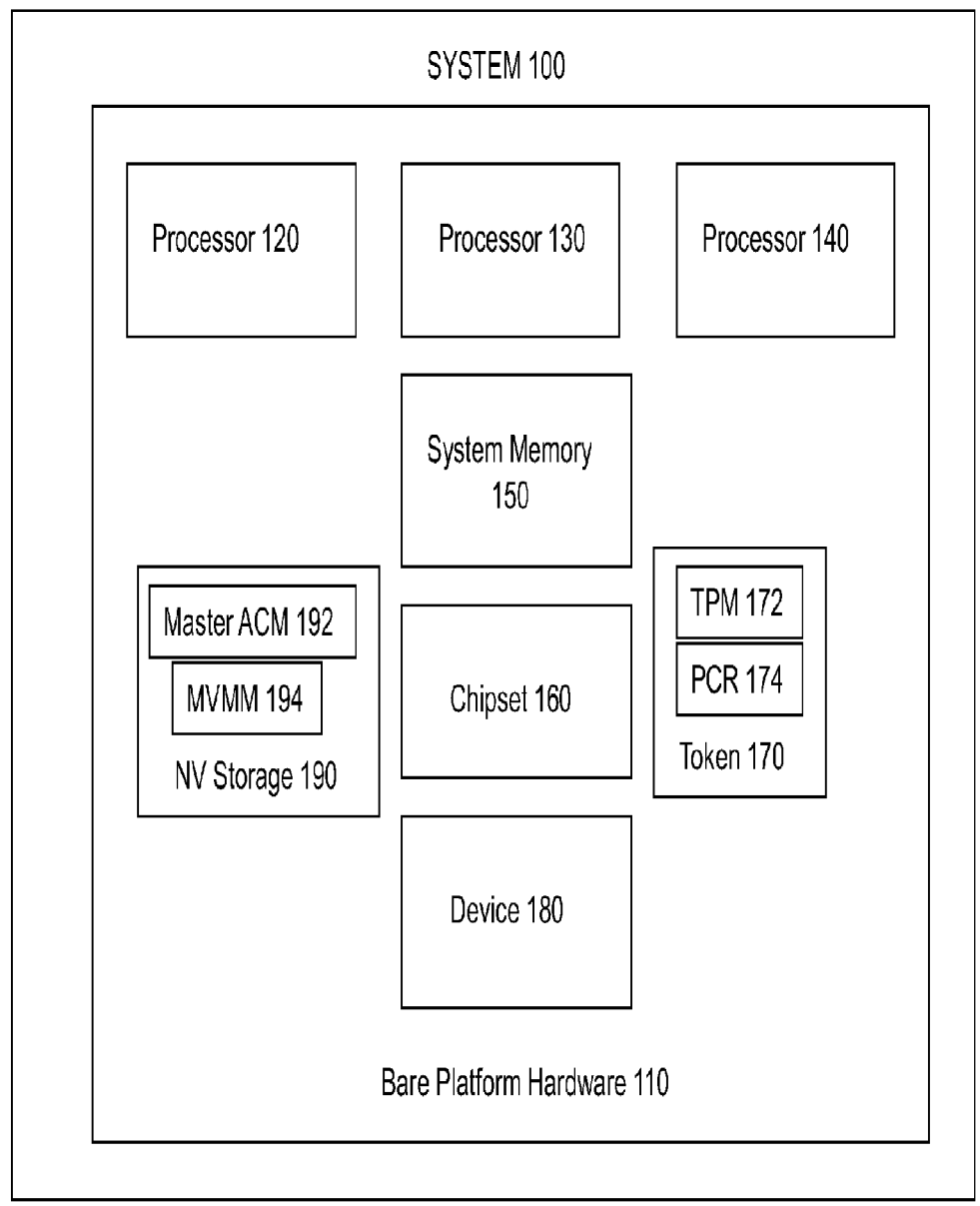
FIG. 1 illustrates an information processing system according to an embodiment of the present invention.

FIG. 1 illustrates an embodiment of the present invention in information processing system 100. Information processing system 100 may be personal computer, a mainframe computer, a portable computer, a handheld device, a set-top box, a server, or any other computing system. In this embodiment, system 100 includes bare platform hardware 110, which in turn includes processors 120, 130, and 140, system memory 150, chipset 160, token 170, device 180, and non-volatile storage 190.

Each of processors 120, 130, and 140 may represent a component having one or more execution cores, where each execution core may be based on any of a variety of different types of processors, including a general purpose microprocessor, such as a processor in the Intel® Pentium® Processor Family, Itanium® Processor Family, or other processor family from Intel® Corporation, or another processor from another company, or a special purpose processor or microcontroller, or may be a reconfigurable core (e.g. a field programmable gate array). Although FIG. 1 shows three such processors, system 100 may include any number of processors, each including any number of execution cores and execution threads, in any combination. In some embodiments, any or all of processors 120, 130, or 140 may represent a separate hardware execution thread or "logical processor" running on one or more physical processors.

System memory 150 may be any medium on which information, such as data and/or program code, may be stored, such as dynamic random access memory, or any other type of medium readable by processors 120, 130, and 140, or any combination of such mediums.

Chipset 160 may represent any group of circuits and logic that supports memory operations, input/output ("I/O") operations, configuration, control, internal or external interface, connection, or communications functions (e.g., "glue" logic and bus bridges), and/or any similar functions for processors 120, 130, and 140 and/or system 100. Individual elements of chipset 160 may be grouped together on a single chip, a pair of chips, dispersed among multiple chips, and/or be integrated partially, totally, redundantly, or according to a distributed approach into one or more processors, including any of processors 120, 130, and/or 140.

Token 170 may include trusted platform module ("TPM") 172 and platform configuration register ("PCR") 174. TPM 172 may be a component, including a microcontroller, to securely store keys, passwords, digital certificates, and other information used to establish and maintain security. PCR 174 may include any number of registers and/or other storage locations to store system configuration information. TPM 172 and/or PCR 174 are configured to be accessible only to certain agents and/or under certain conditions. Token 170 and/or either or both of TPM 172 and PCR 174 may be included in chipset 160 or an other component in system 100.

Device 180 may represent any number of any type of I/O, peripheral, or other devices, such as a keyboard, mouse, trackball, pointing device, monitor, printer, media card, network interface, information storage device, etc. Device 180 may be embodied in a discrete component, or may be included in an integrated component with any other devices. In one embodiment, device 180 may represent a single function in a multifunctional I/O, peripheral, or other device.

Processors 120, 130, and 140, system memory 150, chipset 160, token 170, and device 180 may be coupled to or communicate with each other according to any known approach, such as directly or indirectly through one or more parallel, sequential, pipelined, asynchronous, synchronous, wired, wireless, or other bus or point-to-point connection. System 100 may also include any number of additional devices, agents, components, or connections.

Figure 2:
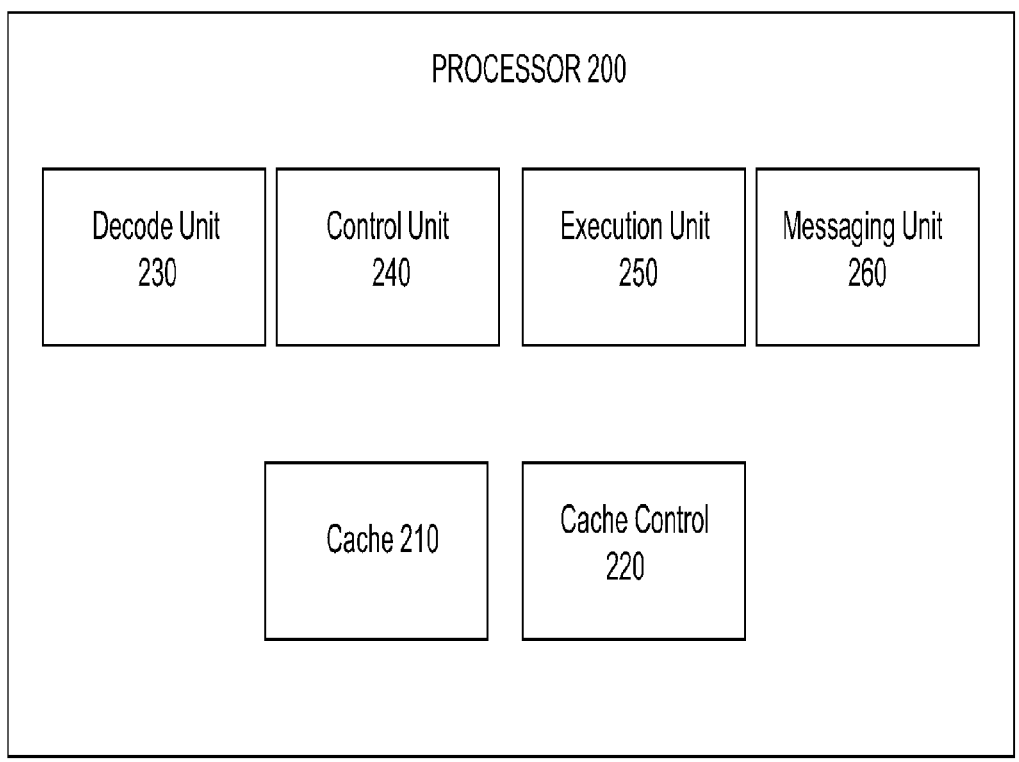
FIG. 2 illustrates a processor according to an embodiment of the present invention.

FIG. 2 illustrates processor 200, which may represent any of processors 120, 130, or 140, in FIG. 1, or any other processor according to an embodiment of the present invention.

Processor 200 may include cache 210, which may be static random access memory, or any other form of storage for information, such as data that is copied from system memory 150. Processor 200 (or cache 210) may also include cache control logic 220 to controls whether cache 210 operates in normal mode or in cache-as-random-access-memory ("CRAM") mode. In normal mode, cache 210 satisfies memory requests in response to cache hits, replaces cache lines in response to cache misses, and may invalidate or replace cache lines in response to snoop requests. In CRAM mode, cache 210 operates as random access memory in which requests within the memory range of the cache memory are satisfied by the cache memory and lines of the cache are not replaced or invalidated in response to snoop requests.

Processor 200 may also include instruction unit 230, control unit 240, execution unit 250, and messaging unit 260. Instruction unit 230 may include any circuitry, logic, or other hardware or structures, such as a decoder, to receive, recognize, decode, or otherwise receive instructions. Control unit 240 may include any circuitry, logic, or other hardware or structures, such as microcode, state machine logic, programmable logic, or any other form of control logic, to generate control signals for, or otherwise control processor 200 in response to instructions received by instruction unit 230 and/or messages received by messaging unit 260.

Execution unit 250 may include any circuitry, logic, or other hardware or structures to execute instructions received by instruction unit 230. Execution unit 250 may operate based on control signals generated by control unit 240. Messaging unit 260 may include any circuitry, logic, or other hardware or structures to generate messages to be sent by processor 200 to other components or agents in system 100, and to receive messages sent to processor 200 by other components or agents in system 100.

In one embodiment of processor 200, instruction unit 210 may be to receive an instruction (a "SENTER" instruction) for processor 200 to begin a process to establish a secured environment in system 100 (a "SENTER" process). In response to the SENTER instruction, control unit 240 generates control signals to cause messaging unit 260 to generate a "SENTER" bus message (or other type of message in a system wherein processors and other agents communicate by a means other than a bus) that is recognized by the messaging units of other processors and agents as a SENTER bus message. The processor or execution thread executing the SENTER instruction and sending the SENTER bus message is referred to as the "initiating logical processor" ("ILP").

Each processor, execution thread, or other agent in the system that receives the SENTER bus message is referred to as a "responding logical processor" ("RLP"). In response to the SENTER bus message, each RLP performs actions to prepare for the establishment of the secured environment and allow the ILP to proceed with launching the secured environment. One of these actions may be for their messaging units to generate an "ACK" bus message to acknowledge the receipt of the SENTER bus message.

Figure 3:
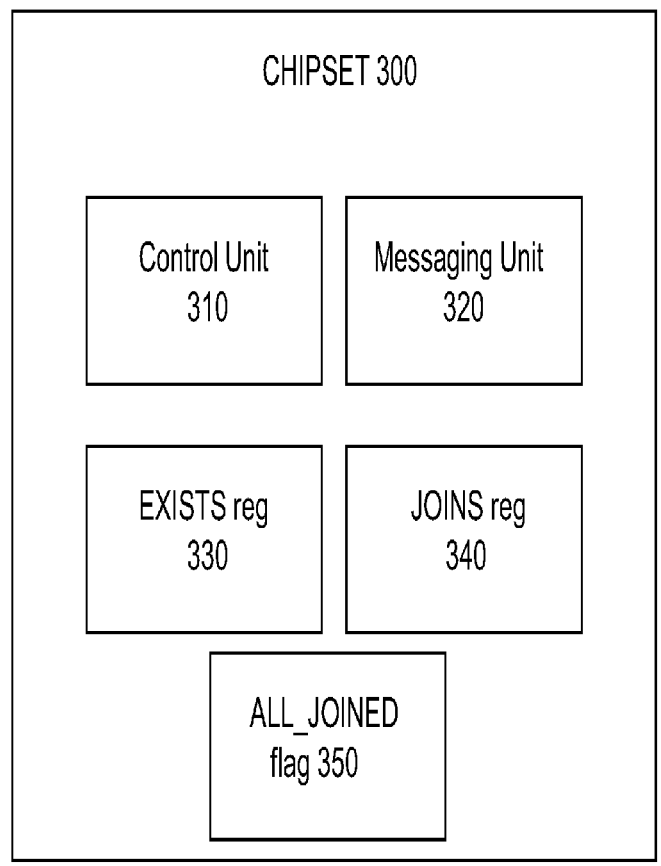
FIG. 3 illustrates a chipset according to an embodiment of the present invention.

FIG. 3 illustrates chipset 300, which may represent chipset 160, or any other chipset or component performing the function of chipset 160 according to an embodiment of the present invention. Chipset 300 may include messaging unit 310, control unit 320, "EXISTS" storage location 330, "JOINS" storage location 340, and "ALL_JOINED" storage location 350.

Messaging unit 310 may include any circuitry, logic, or other hardware or structures to generate messages to be sent by chipset 300 to other components or agents in system 100, and to receive messages sent by other components or agents in system 100. Control unit 320 may include any circuitry, logic, or other hardware or structures, such as microcode, state machine logic, programmable logic, or any other form of control logic, to generate control signals for, or otherwise control chipset 200 in response to messages received by messaging unit 310.

Each of "EXISTS" storage location 330, "JOINS" storage location 340, and "ALL_JOINED" storage location 350 may include a register or any other form of storage for information, and may include storage for any number of bits. In one embodiment, control unit 320 may use EXISTS storage location 330 to keep track of all logical processors and other agents operating in system 100, and JOINS storage location 340 to keep track of all logical processors and other agents that have acknowledged a SENTER bus message. When all processors and other agents in system 100, as reflected in EXISTS storage location 330, have acknowledged the SENTER bus message, as reflected in JOINS storage location 340, then control unit 320 may set an indicator in "ALL_JOINED" storage location 350 to indicate to the ILP that the launching of a secured environment may proceed. Note that in this description of the SENTER process, as in the rest of this description, many details not required to describe and enable embodiments of the present invention have been omitted, and many variations of the process are possible. For example, where the ILP and RLPs are connected on by a front-side processor bus ("FSB"), FSB transactions may include an identifier of the initiator of each transaction, and chipset 300 may be connected to the FSB to keep track of all FSB logical processors or other bus agents.

Returning to FIG. 1, non-volatile storage 190 may represent any number of separate non-volatile storage mediums in system 100, such as semiconductor flash memory or magnetic or optical disk. Non-volatile storage 190 may be used to store software components used in embodiments of the present invention. For example, non-volatile storage 190 may store authenticated code module ("ACM") 192 and measured virtual machine monitor ("MVMM") 194.

ACM 192 may be executed by a processor or processors during the SENTER process to perform any number of actions involved in establishing a secured environment. For example, ACM 192 may be used to initialize, configure, and test components within system 100 for their participation in the secured environment. In one embodiment, ACM 192 may be used to test the memory configuration of system 100, as controlled by memory controller functions in any processor, chipset, or other component in system 100, to ensure that access to certain pages or portions of system memory 150 may be limited or controlled such that MVMM 194 and/or other software used to secure system 100 may be protected when stored in system memory 150. In another embodiment, ACM 192 may be used to authenticate MVMM 194 and any other software to be used within the secured environment, and to launch the execution of MVMM 194.

MVMM 194 may be any virtual machine monitor, hypervisor, or other such software program that is a trusted entity invoked during a SENTER process to control one or more virtual machines to execute other software programs (often called a measured launch environment, or "MLE"), some of which are trusted and some of which are not trusted.

To establish a secured environment in system 100, system software such as an operating system ("OS") or basic input/output system ("BIOS"), running on any of processors 120, 130, 140, or any other processor in system 100 may transfer ACM 192 and MVMM 194 from non-volatile storage 190 to system memory 150, then cause one of these processors (e.g., processor 120) to execute a SENTER instruction. Execution of the SENTER instruction may cause processor 120, as the ILP, to issue a SENTER bus message, poll ALL_JOINED storage location 350 until all RLPs have acknowledged the SENTER bus message, configure cache 122 to operate in CRAM mode, and load ACM 192 (or a portion of ACM 192, in accordance with an embodiment of the present invention, as described below) into cache 122. Cache 122 may be configured to operate in CRAM mode so that cache 122 may serve as a private, secure memory in which processor 120 may authenticate ACM 192 (or a portion of ACM 192, in accordance with an embodiment of the present invention, as described below).

An ACM may be written for a specific processor and/or chipset, and digitally signed by the manufacturer or vendor of the processor and/or chipset. Because of the complexities of the various actions to be taken to bring each processor in a system to a stable state in which to join in a SENTER process, it may be desirable for RLPs, in addition to the ILP, to execute an ACM or some portion of an ACM. Furthermore, a system such as system 100 may include two or more processors of different steppings, versions, or types. Therefore, it may be desirable to combine the code for different processors into one ACM, so that any of the different processors may serve as the ILP, and/or so that an RLP may execute an ACM or some portion of an ACM. However, the size of the ACM may be limited to the size of the cache memory (e.g., 64 kilobytes) into which it may be loaded for authentication. Therefore, embodiments of the present invention provide for more than one ACM to be used, or available for use, in a SENTER process.

Figure 4:
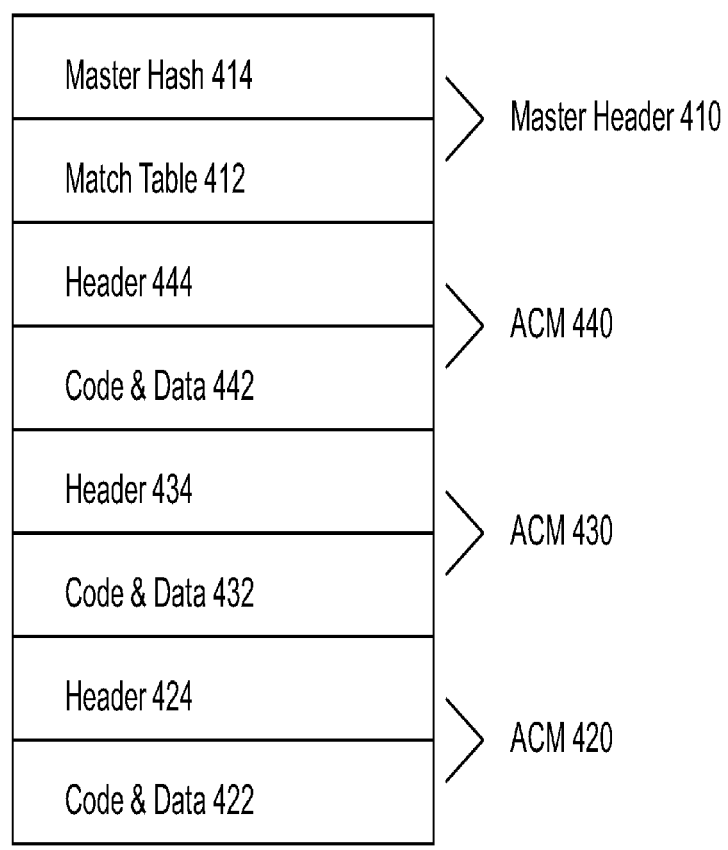
FIG. 4 illustrates a master authenticated code module according to an embodiment of the present invention.

FIG. 4 shows master ACM 400 according to an embodiment of the present invention, which may be used as ACM 192 in system 100. Master ACM 400 includes master header 410, ACM 420, ACM 430, and ACM 440. Each of ACM 420, 430, and 440 may be written for a different stepping, version, or type of processor. For example, ACM 420, ACM 430, and ACM 440 may be written for processors 120, 130, and 140, respectively, in system 100.

Each of ACM 420, 430, and 440 may include a section containing code and data (e.g., sections 422, 432, and 442, respectively), and a section containing a header (e.g., sections 424, 434, and 444, respectively). Each of the code and data sections includes the code to be executed by a processor during a SENTER process, along with data to be used during execution of this code and/or scratchpad locations for data generated during execution of this code. Each of the header sections includes a digest and/or digital signature (a "hash") and/or other value derived from or otherwise representing the corresponding ACM, generated by a hashing and/or other cryptographic function. Each of the header sections may also include information regarding the author, size, version, etc. of the ACM. The information in these header sections may be used to authenticate (i.e., verify the authenticity of) the corresponding ACM.

Master header 410 may include match table 412 and master hash 414. Match table 412 may include a table that identifies each processor included in system 100, e.g. based on a unique processor identifier readable from a register or other storage location within or associated with each processor ("CPU ID"). For each CPU ID, the match table indicates which ACM included in master ACM 400 is to be executed by that processor, based on a stepping, version, type or other information regarding the processor.

Master hash 414 includes a hash derived from or otherwise representing a concatenation of match table 412 and headers 424, 434, and 444 (or a portion of each of headers 424, 434, and 444). Master hash 414 may be generated by a hashing and/or other cryptographic function performed on the concatenation of match table 412 and the hashes of ACMs 420, 430, and 440. Therefore, master hash 414 may be used to authenticate all of the information included in master ACM 400.

FIG. 5 illustrates a method embodiment of the present invention, specifically method 500 for entering a secured computing environment using multiple authenticated code modules. Although method embodiments of the invention are not limited in this respect, reference may be made to elements of system 100, processor 200, chipset 300, or master ACM 400 to describe method 500 of FIG. 5. Furthermore, method 500 may represent a compilation of separate methods, each potentially performed at different locations by a different entity or person or automatically.

Furthermore, certain actions performed in method 500 may be performed by processor 200 in response to control signals generated by control unit 240 (e.g., boxes 550 through 558), or by chipset 300 in response to control signals generated by control unit 320. Control signals in processor 200 may in turn be generated in response to instruction unit 230 decoding an instruction into one or more micro-instructions or micro-operations, and/or messaging unit 260 receiving a bus message or other transaction, and control signals in chipset 300 may in turn be generated in response to messaging unit 310 receiving a bus message or other transaction.

In box 502 of FIG. 5, method 500 may begin.

In box 510, any number of individual ACMs, such as ACMs 420, 430, and 440, may be written or otherwise created, for example by or for manufacturers or vendors of processors or other information processing system components. In box 512, a hash may be created for each ACM, by applying a hashing or other such algorithm to the code, data, and/or other sections of the ACM. In box 514, each hash may be encrypted by applying a cryptographic algorithm using, for example, a public/private key pair. In box 516, each hash may be added to the header of the corresponding ACM.

In box 520, a master ACM, such as master ACM 400, may be created for an information processing system, such as system 100. The master ACM may be created, for example by or for the system manufacturer or vendor, using any number of individual ACMs, such as ACMs 420, 430, and 440. In box 522, a match table, such as match table 412, may be created by creating an entry for each processor or other agent in system 100, including an identifier of each processor along with an indication of which ACM is to be executed by that processor.

In box 524, the match table may be concatenated with the hashes for each individual ACM included in the master ACM. In box 526, a master hash, such as master hash 414, may be created by applying a hashing or other such algorithm to the concatenation of the match table and individual ACM hashes. In box 528, the master hash may be encrypted by applying a cryptographic algorithm using, for example, a public/private key pair.

In box 530, the master ACM may be completed by concatenating the master hash and the match table into a master header, and concatenating the master header with the individual ACMs. In box 532, the master ACM may be loaded or otherwise installed in the system, for example in a non-volatile storage such as non-volatile storage 190.

In box 540, the master ACM may be copied from non-volatile storage to system memory, such as system memory 150, for example, by a BIOS, boot loader, or an OS running in system 100. In box 542, the entry of system 100 into a secured system environment may be initiated, for example, by a BIOS, boot loader, an OS issuing a SENTER instruction to processor 120. In box 544, processor 120 may send a SENTER bus message. In box 546, each RLP in system 100, for example, processors 130 and 140, may send ACK bus messages. In box 548, an indication that all RLPs have joined in the SENTER process may be set, for example, in ALL_JOINED storage location 350.

In box 550, a processor (e.g., the ILP or and RLP) in system 100 may read the match table in the master ACM to find a corresponding entry. If a match is not found, then in box 552, the processor may write an error code value to non-volatile memory and cause a system reset. However, if a match is found, then in box 554, the processor may configure its cache to operate in CRAM mode and load the master header and the matching individual ACM into its cache.

In box 556, the processor may attempt to authenticate the master header and the matching ACM by hashing each and comparing the resulting hashes to the master hash and the individual ACM hash read from the master ACM. If either comparison fails, then, in box 552, the processor may write an error code value to non-volatile memory and cause a system reset. However, if both the master header and the matching individual ACM are successfully authenticated, then in box 558, the master hash may be sent to a token, such as token 170, to be stored in a PCR for use in sealing and unsealing secrets in the measured launch environment or secured system environment.

In box 560, boxes 550 through 558 may be repeated by each other processor in system 100. In box 562, one or more processors in system 100 may begin to execute its ACM. In box 564, a processor executing an ACM may launch an MVMM. In box 566, entry of system 100 into a measured launch environment ("MLE") or secured system environment may be completed.

In box 598, method 500 may end.

Within the scope of the present invention, it may be possible for method 500 to be performed in a different order, with illustrated block performed simultaneously, with illustrated blocks omitted, with additional blocks added, or with a combination of reordered, combined, omitted, or additional blocks. Many variations of method embodiments of the present invention may be possible, but may not be apparent from the description of method 500. For example, creating the master ACM in boxes 520 through 530 may occur outside of system 100 or within system 100.

Thus, systems, apparatuses, and methods, and systems for entering a secured computing environment using multiple authenticated code modules have been disclosed. While certain embodiments have been described, and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A non-transitory computer-readable medium storing instructions which when executed by a computer cause the computer to perform a method comprising:
    finding, by a first processor in response to the first processor decoding a secure enter instruction, a first entry corresponding to the first processor in a match table in a master authenticated code module, the first entry to indicate a first correspondence between the first processor and a first individual authenticated code module in the master authenticated code module;
    loading, also in response to the first processor decoding a secure enter instruction, a master header from the master authenticated code module into a first secure memory in the first processor;
    loading, also in response to the first processor decoding the secure enter instruction, the first individual authenticated code module from the master authenticated code module into the first secure memory;
    finding, by a second processor in response to the second processor decoding the secure enter instruction, a second entry corresponding to the second processor in the match table, the first entry to indicate a second correspondence between the second processor and a second individual authenticated code module in the master authenticated code module;
    loading, also in response to the second processor decoding the secure enter instruction, the master header from the master authenticated code module into a second secure memory in the second processor; and loading, also in response to the second processor decoding the secure enter instruction, the second individual authenticated code module from the master authenticated code module into the second secure memory.

2. The medium of claim 1, wherein the first secure memory is a cache memory of the first processor.

3. The medium of claim 1, further comprising authenticating the master header and the first individual authenticated code module within the first secure memory.

4. The medium of claim 1, further comprising selecting the first individual authenticated code module from a plurality of individual authenticated code modules in the master authenticated code module.

5. The medium of claim 4, wherein selecting the first individual authenticated code module is based on the first entry in the match table.

6. The medium of claim 3, further comprising sending a master hash to a token after authenticating the master header and the first individual authenticated code module.

7. The medium of claim 1, wherein the second secure memory is a cache memory of the second processor.

8. The medium of claim 1, further comprising authenticating the master header and the second individual authenticated code module within the second secure memory.

* * * * *